United States Patent
Wiercisnki et al.

(10) Patent No.: US 8,453,405 B2
(45) Date of Patent: Jun. 4, 2013

(54) WATERPROOFING MEMBRANE

(75) Inventors: Robert A. Wiercisnki, Lincoln, MA (US); Hongmei Ding, Beijing (CN); Xia Cao, Acton, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/577,460

(22) PCT Filed: Feb. 8, 2010

(86) PCT No.: PCT/CN2010/000166
§ 371 (c)(1),
(2), (4) Date: Aug. 7, 2012

(87) PCT Pub. No.: WO2011/094898
PCT Pub. Date: Aug. 11, 2011

(65) Prior Publication Data
US 2013/0008124 A1    Jan. 10, 2013

(51) Int. Cl.
*E04B 5/00* (2006.01)

(52) U.S. Cl.
USPC ............... 52/408; 52/411; 428/150; 428/144

(58) Field of Classification Search
USPC ............. 52/408, 411, 309.9, 309.3, 309.17, 52/309.14, 309.5, 309.6, 309.8; 428/40.1, 428/40.3, 150, 144, 351, 354
See application file for complete search history.

(56) References Cited

U.S. PATENT DOCUMENTS

| | | | |
|---|---|---|---|
| 3,373,074 A * | 3/1968 | Eustachio et al. | 428/313.9 |
| 3,900,102 A * | 8/1975 | Hurst | 206/411 |
| 4,172,830 A | 10/1979 | Rosenberg et al. | |
| 4,215,160 A | 7/1980 | Rosenberg et al. | |
| 4,239,795 A * | 12/1980 | Haage et al. | 428/60 |
| 4,357,377 A * | 11/1982 | Yamamoto | 428/40.3 |
| 4,751,122 A * | 6/1988 | May | 428/40.3 |
| 4,994,328 A | 2/1991 | Cogliano | |

(Continued)

FOREIGN PATENT DOCUMENTS

| CN | 1127701 | 7/1996 |
|---|---|---|
| WO | 0024970 | 5/2000 |
| WO | 2005091931 | 10/2005 |

OTHER PUBLICATIONS

International Search Report for Int'l Appln No. PCT/CN2010/000166, Nov. 18, 2010, 7 pages.

(Continued)

*Primary Examiner* — Joshua J Michener
*Assistant Examiner* — Chi Q Nguyen
(74) *Attorney, Agent, or Firm* — Stephan P. Williams; Craig K. Leon

(57) ABSTRACT

Disclosed is a waterproofing membrane that bonds to concrete cast against it (i.e., post-cast concrete). The membrane includes a flexible carrier sheet, a pressure sensitive adhesive and reflective particles on the surface of the adhesive. The reflective particles should have an average diameter equal to or greater than the thickness of the pressure sensitive adhesive. Preferably, the reflective particles are ground white cement, ground hydrated white cement, ground partially-hydrated white cement or a mixture of two or more of these. The membrane does not have a removable release sheet that is typically used to prevent the adhesive portion of the membrane from adhering to the carrier sheet or other portion of the membrane when the membrane is rolled up.

15 Claims, 1 Drawing Sheet

U.S. PATENT DOCUMENTS

| | | | |
|---|---|---|---|
| 5,112,678 A * | 5/1992 | Gay et al. | 442/173 |
| 5,271,781 A | 12/1993 | Anno et al. | |
| 5,316,848 A | 5/1994 | Bartlett et al. | |
| 5,496,615 A * | 3/1996 | Bartlett et al. | 428/144 |
| 5,543,188 A | 8/1996 | Te'eni | |
| 5,824,401 A | 10/1998 | Jenkins et al. | |
| 6,235,365 B1 * | 5/2001 | Schaughency et al. | 428/40.1 |
| 6,500,520 B1 | 12/2002 | Wiercinski et al. | |
| 6,648,962 B2 | 11/2003 | Berke et al. | |
| 6,746,764 B2 | 6/2004 | Anspach | |
| 7,771,807 B2 * | 8/2010 | Hubbard | 428/40.1 |
| 8,104,245 B2 * | 1/2012 | Whelan et al. | 52/741.4 |

OTHER PUBLICATIONS

Written Opinion of the International Searching Authority for Int'l Appln No. PCT/CN2010/000166, Nov. 18, 2010, 6 pages.

* cited by examiner

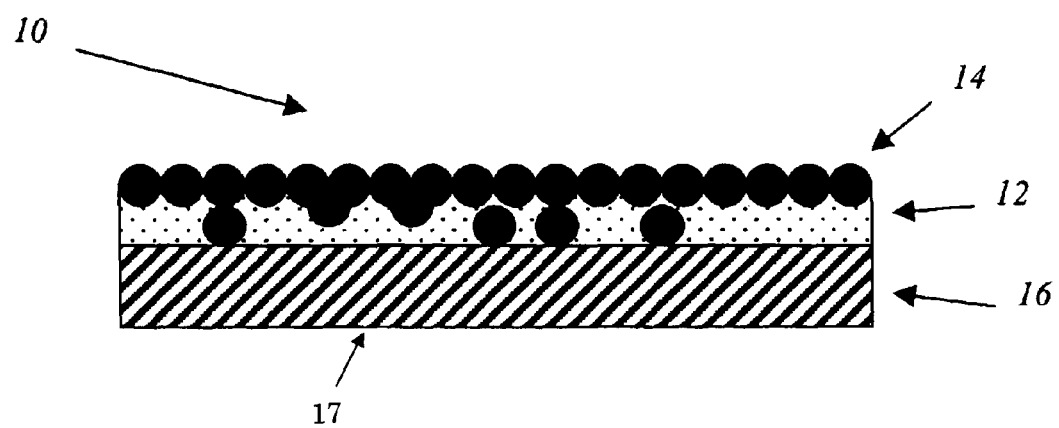

WATERPROOFING MEMBRANE

CROSS-REFERENCE TO RELATED APPLICATION

This application is a 371 of PCT/CN2010/000166 filed on Feb. 8, 2010.

FIELD OF THE INVENTION

The present invention relates to a waterproofing membrane that bonds to concrete cast against it (i.e., post-cast concrete). The membrane includes a flexible carrier sheet, a pressure sensitive adhesive, and reflective particles. However, the membrane does not have a removable release sheet to prevent the adhesive portion of the membrane from adhering to the carrier sheet or other portion of the membrane when the membrane is rolled up.

BACKGROUND OF THE INVENTION

Sheet-like waterproofing membrane laminates are well-known for application to concrete and other substrates. These laminates typically comprise a carrier sheet and a pressure sensitive adhesive layer (and optionally other layers). In many applications, the waterproofing sheet material is applied to a concrete substrate that has already been formed, such as a building foundation. In such a case, the adhesive layer of the membrane is applied against the cured concrete surface. In another technique, the waterproofing membrane is affixed to a lagging with the carrier sheet against the lagging and the adhesive portion (which may have an optional coating thereon) facing toward the cavity, circumscribed by a concrete form, in which the concrete is poured. The adhesive portion of the membrane will adhere to the freshly poured concrete (i.e., post-cast concrete), thus providing a fully adhered waterproofing membrane on the cured concrete surface after the form is removed. This technique is sometimes referred to as "blind side" (or pre-applied) waterproofing. A similar process may be used on horizontal surfaces where the membrane is applied to compacted soil or gravel or to a concrete slab, with the adhesive portion facing upward, then casting concrete against the membrane.

In addition to the carrier sheet and pressure sensitive adhesive layer, typical commercial waterproofing membranes include a removable release sheet that is used to prevent the adhesive portion of the membrane from adhering to the carrier sheet or other portion of the membrane when the membrane is rolled up. This release sheet must be removed from the membrane prior to or during installation and disposed in the trash, thus creating environmental waste.

U.S. Pat. No. 3,900,102 (Hurst) discloses one such membrane comprising a polyethylene support sheet, a bituminous adhesive and a releasable siliconized paper for protecting the adhesive. The release paper is removed as the membrane is unrolled and adhered to a building substrate (see Hurst FIG. 4). U.S. Pat. No. 4,751,122 (May) discloses a membrane laminate that includes a sheet-like paper substrate with a release coating (e.g., silicone) on one face and a waterproofing pressure sensitive adhesive on the other face. This membrane also includes a removable strip along the edge which, when removed, permits overlapping seams to adhere. U.S. Pat. No. 4,172,830 (Rosenberg) and U.S. Pat. No. 4,215,160 (Rosenberg) disclose paperless membrane laminates that include a silicone release coating on the outer surface of the carrier sheet to prevent the adhesive layer from adhering to the carrier sheet when the membrane is rolled up. U.S. Pat. No. 5,254,661 (Wilson) discloses a similar type of paperless membrane laminate in which the release coating is a water-based silicone emulsion. During installation, edge portions of the release coating may be removed by wet abrasion to permit adhesion of overlap seams of adjacent membranes.

U.S. Pat. No. 4,994,328 (Cogliano) discloses a waterproofing membrane capable of adhering to freshly poured concrete (i.e., blind-side or pre-applied waterproofing). The membrane has a bituminous adhesive layer that is coated with a non-tacky, water-insoluble polymeric coating such as, for example, a polyvinyl alcohol, silica, and glycerin mixture in a weight ratio of 1:10:0.5. The coating purportedly protects the adhesive layer while permitting a strong adhesive bond to freshly poured concrete. However, the coating can be slippery when wet and, thus, not suitable for foot traffic. U.S. Pat. No. 5,316,848 (Bartlett) discloses a similar blind-side waterproofing membrane that includes a carrier layer, a pressure sensitive adhesive layer, and a protective coating on the adhesive layer, wherein the protective coating may be selected from various types of polymers, preferably an acrylic-based elastomer, such as styrene butyl acrylate. U.S. Pat. No. 5,496,615 (Bartlett) discloses a similar membrane laminate where the protective coating has a finely divided particulate material, such as sand, calcium carbonate, cement, titanium dioxide, etc., dusted thereon. The particulate material may have a particle size in the range of 0.1 to 1000 μm, preferably 0.2 to 100 μm. It should be noted that the particulate material is dusted onto the protective coating layer, not the adhesive layer.

U.S. Pat. No. 5,271,781 (Anno) discloses a waterproof sheet for concrete structures. The sheet is made of a thermoplastic synthetic resin and has cement powder pressed against and adhered to a surface of the sheet. However, the waterproof sheet does not include a pressure sensitive adhesive. In use, a cement paste layer is applied to the surface of a concrete substrate, then the powder coated sheet is applied against the wet cement paste layer, whereby the sheet adheres to the cement paste layer. U.S. Pat. No. 5,543,188 (Te'eni) discloses a waterproofing membrane that includes a polymeric sheet having fibrous surface layers on opposite faces. The fibrous surface layers are impregnated with a cementitious bonding material (e.g., cement powder) that is in a substantially non-hydrated condition, which will bond to wet concrete cast against the membrane. This membrane does not include a pressure sensitive adhesive.

U.S. Pat. No. 6,500,520 (Wiercinski) discloses a membrane laminate having a carrier support sheet, an adhesive layer, and embedded on the adhesive layer a layer of granulated inorganic particulates capable of reacting with concrete, such as aluminum oxide trihydrate, silica dioxide, fly ash, blast furnace slag, alkali or alkaline earth metal salts, etc. The particles, which may range in size from 5 to 1000 μm, may optionally be attached to the adhesive layer using a water-soluble material such as ethylene vinyl acetate or polyvinyl alcohol.

WO2005/091931 (Seth) discloses a shaped waterproofing membrane having a three-dimensional contour that may be used to cover detail areas such as tiebacks. These shaped membranes may include a protective layer such as particles embedded into the outer adhesive layer and/or outer polymer coating layer. The particles may be the same particles described in the aforementioned Bartlett and Wiercinski patents.

U.S. Pat. No. 6,746,764 (Anspach) discloses self-adhering surface coverings such as floor tiles. The surface coverings include a substrate, such as tile, parquet, etc., having a pressure sensitive adhesive layer and a barrier layer disposed on the adhesive layer. The barrier layer permits the surface coverings to be stacked without the need for a release layer between adjacent surface coverings. The barrier layer includes particles that are crushable above 20 psi and that have a diameter at least equal to or greater than the thickness of the adhesive layer (typically about 2-6 mils (50-152 µm)). The particles may be uniformly distributed on the adhesive layer and may cover about 1% to 10% of the adhesive surface. While the particles may include a variety of materials, there is no suggestion to use cement or hydrated cement. Since this disclosure is directed to surface coverings such as floor tiles, there is no suggestion to cast concrete against the barrier layer.

Typical commercial waterproofing membranes used for blind-side (or pre-applied) applications include a release sheet and unroll wrong side up with the adhesive portion (or protective coating portion) facing downward. This forces the installer to first unroll then flip over a large, unwieldy membrane prior to installing it. Alternatively, two installers are needed to lift the heavy roll so that it may be unrolled from the top.

It would be advantageous to provide a waterproofing membrane that binds strongly to concrete cast against its surface, particularly after the membrane has been exposed to sunlight. In addition, it would be advantageous to provide a waterproofing membrane that has a highly reflective surface that will protect the adhesive layer from sunlight. Further, it would be advantageous to provide a waterproofing membrane that has an outer surface that will tolerate foot traffic. It would also be advantageous to provide a waterproofing membrane that does not require a release sheet that must be removed and disposed of at the job site.

SUMMARY OF THE INVENTION

The present invention relates to a waterproofing membrane that bonds to concrete cast against it (i.e., post-cast concrete). The membrane includes a flexible carrier sheet, a pressure sensitive adhesive, and reflective particles. However, the membrane does not have a removable release sheet that is typically used to prevent the adhesive portion (or protective coating portion) of the membrane from adhering to the carrier sheet or other portion of the membrane when the membrane is rolled up.

In one embodiment, the waterproofing membrane comprises a flexible carrier sheet with two opposed surfaces, an approximately uniform layer of a waterproofing pressure sensitive adhesive on one surface of the carrier sheet such that the pressure sensitive adhesive has an average thickness in the range of 75 µm to 500 µm, preferably 100 µm to 400 µm, more preferably 125 µm to 375 µm, most preferably 125 µm to 300 µm. The pressure sensitive adhesive layer has an outer exposed surface onto which are adhered substantially reflective inorganic particles. The substantially reflective inorganic particles have an average diameter approximately equal to or greater than the average thickness of the pressure sensitive adhesive layer. In addition, the substantially reflective particles cover approximately 70% to 100%, preferably 80% to 100%, most preferably 90% to 100% of the outer exposed surface of the pressure sensitive adhesive.

In a preferred embodiment, the substantially reflective inorganic particles comprise ground white cement, ground hydrated white cement, ground partially-hydrated white cement or a mixture of two or more of these. In another preferred embodiment, the substantially reflective inorganic particles have an average diameter of about 100 µm to about 600 µm.

The present invention also embraces a method of waterproofing a concrete structure comprising applying a waterproofing membrane as defined herein to a substrate (e.g., lagging, gravel, concrete, soil retention system or concrete form) with the substantially reflective inorganic particles of the membrane facing the area into which the concrete will be cast, and casting concrete such that it contacts the substantially reflective particles of the membrane.

BRIEF DESCRIPTION OF THE DRAWINGS

FIG. 1 depicts a cross-section of a waterproofing membrane of the present invention.

DETAILED DESCRIPTION OF THE INVENTION

One embodiment of the waterproofing membrane of the present invention is depicted in FIG. 1, which shows a cross-section of the waterproofing membrane taken along the width of the membrane. Typical commercial waterproofing membranes will have a width in the range of 30 to 185 cm, more typically 60 to 140 cm, preferably 80 to 130 cm. They typically will have a length of from 5 to 60 m, more typically 15 to 36 m, and are rolled up into a roll.

As shown in FIG. 1, the waterproofing membrane 10 comprises three layers. One layer comprises a flexible carrier sheet 16 with two opposed surfaces. A second layer comprises an approximately uniform layer of a waterproofing pressure sensitive adhesive 12 on one surface of the carrier sheet. A third layer comprises substantially reflective inorganic particles 14 adhered to the outer exposed surface of the pressure sensitive adhesive (i.e., the surface opposite the surface of the pressure sensitive adhesive that is adhered to the carrier sheet) so as to provide the membrane with a substantially reflective surface.

The carrier sheet 16 provides mechanical strength and waterproofing integrity for the membrane. The carrier sheet typically will have a thickness of about 0.05 to 2.0 mm, preferably about 0.3 to 1.0 mm, and should comprise a generally smooth surface, such as is provided by films, sheets, fabrics, and extrusion coated woven and non-woven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC), polyamides or a combination of two or more of these materials. Polyethylene and polypropylene are preferred. A preferred carrier sheet comprises a thermoplastic film of high density polyethylene (HDPE). Fabrics may be woven or non-woven and may comprise polyethylene, polypropylene, polyethylene terephthalate and polyamide. A woven polypropylene fabric is particularly suitable.

Generally, the carrier sheet is not surface treated to increase the surface tension. However, in some cases it may be desirable to treat the surface of the carrier sheet on which the adhesive will be applied in order to enhance adhesion of the adhesive to the carrier sheet. One such surface treatment option is corona treatment. Preferably, the carrier sheet will not be corona treated, particularly the surface of the carrier sheet opposite the surface that is coated with the pressure sensitive adhesive since that surface will come in contact with the particulate layer 14 when the membrane is rolled up into a roll.

Additives may be incorporated into the carrier material to reduce surface tension. These may be incorporated into the bulk of the material in a separate compounding step. The additives may also be incorporated into the bulk of the material during the melt extrusion process to produce a sheet, film, or extrusion coated fabric.

The pressure sensitive adhesive 12 will comprise a substantially uniform layer with an average thickness in the range of 75 µm to 500 µm, preferably 100 µm to 400 µm, more preferably 125 µm to 375 µm, most preferably 125 µm to 300 µm.

Suitable pressure sensitive adhesives include butyl rubber based adhesives, polyisobutylene based adhesives, butyl based adhesives, acrylic based adhesives, styrene-isoprene-styrene (SIS) based adhesives, styrene-ethylene-butylene-styrene (SEBS) based adhesives, styrene-butadiene-styrene (SBS) based adhesives, styrene-butadiene rubber (SBR) based adhesives, and combinations thereof. Preferably, the synthetic adhesive is a pressure sensitive hot melt adhesive block copolymer of SIS, SBS or SEBS. For a more detailed description of pressure sensitive adhesives, see Satas, Handbook Of Pressure Sensitive Adhesive Technology, by Van Nostrand Reinhold Company, Inc. (1982), incorporated herein by reference.

Other pressure sensitive adhesives may comprise amorphous polyolefins. Amorphous polyolefin (APO) is defined as polyolefin with a degree of crystallinity of less than 30% as measured by differential scanning calorimetry. These polymers can be either homopolymers of propylene or copolymers of propylene with one or more α-olefin comonomer, such as, for example, ethylene, 1-butene, 1-hexene, 1-octene and 1-decene. The APO polymers of the types herein described above are commercially available from Eastman Chemical Company under the trade name designation Eastoflex or from Huntsman Corporation under the trade name designation Rextac or from Degussa Corporation under the trade name designation Vestoplast. Like rubber based adhesives, these are also combined with a tackifier and plasticizer to produce a pressure sensitive adhesive. See Eastman bulletin "Pressure-Sensitive Adhesives Based on Amorphous Polyolefin From Eastman Chemical Company."

The use of rubber modified bitumen pressure sensitive adhesives is not contemplated for the present invention. These materials exhibit very poor degradation resistance and rapid loss of bond to concrete after UV exposure.

Generally, for improved adhesion to post cast concrete it is preferred that the pressure sensitive adhesive has a penetration greater than about 30 decimillimeters (dmm) (150 g, 5 sec., 70° F.) as measured according to ASTM D 5-73, incorporated herein by reference.

The pressure sensitive adhesive can optionally contain typical additives, such as light absorbers (e.g., titanium dioxide, benzophenones, benzotriazoles, hydroxyphenyl-triazine, etc.), light stabilizers (e.g., hindered amines), antioxidants (e.g., hindered phenols), fillers (e.g., calcium carbonate, silica, titanium dioxide, etc.), plasticizers, rheological additives, and combinations thereof.

The pressure sensitive adhesive layer has an outer exposed surface onto which are adhered substantially reflective inorganic particles 14. The substantially reflective inorganic particles have an average diameter approximately equal to or greater than the average thickness of the pressure sensitive adhesive layer. Preferably, the substantially reflective inorganic particles will have an average diameter of about 100 µm to about 600 µm. In addition, the substantially reflective particles cover approximately 70% to 100%, preferably 80% to 100%, most preferably 90% to 100% of the outer exposed surface of the pressure sensitive adhesive, so as to provide the membrane with a substantially reflective surface.

The percentage of particle-coated area can be measured using scanning electron microscopy to generate an X-ray back-scatter image of the carbon exposed at the membrane surface. The uncoated area of the membrane surface contains carbon in the exposed pressure sensitive adhesive not covered by inorganic particles. A small sample of coated membrane is mounted on a double-sided carbon adhesive stub. It is not coated with carbon so as not to interfere with the carbon signal from the sample. The carbon signal from the sample is measured using scanning electron microscopy with a low accelerating voltage of 8 kv, to minimize background signal, and a 400 msec dwell time. An X-ray map of the back-scatter image is collected and EDAX software is used to calculated percent coverage.

The substantially reflective inorganic particles protect the waterproofing membrane from sunlight exposure and, thus, provide a good bond to concrete. These particles keep the membrane cooler and block damaging UV exposure, thus minimizing the rate of degradation of the pressure sensitive adhesive. Membranes without substantially reflective particles will suffer degradation of the pressure sensitive adhesive by heat and UV radiation and will not bond well to concrete after such exposure.

Suitable substantially reflective inorganic particles include ground white cement, ground hydrated white cement, ground partially-hydrated white cement or a mixture of two or more of these. The white cements have very low to no iron content (e.g., <1% C4AF) and include white Portland cement, hydrated white Portland cement, white aluminate cement, hydrated white aluminate cement, white calcium sulfo-aluminate cement, and hydrated white calcium sulfo-aluminate cement. Most preferred inorganic particles are the ground hydrated white cements. White Portland cement is similar to gray Portland cement except that it has much lower level (<1%) of iron-rich ferrite (C4AF) and a higher level (typically 12-15%) of aluminate (C3A).

Reflectivity can be measured with a NOVO-SHADE 45/0 Reflectometer. The test surface is illuminated from a 45° angle and the intensity of scattered light at the perpendicular (i.e., 0°) is measured. Data is recorded on a grey scale where black is 0% and white is 100%. Only shading is measured, irrespective of color, and is referred to as % whiteness. The reflective surface of the membrane of the present invention (i.e., the reflective particulate layer) exhibits a whiteness value that is greater than 55%, preferably greater than 65%, more preferably at least about 70% or greater, up to about 85%.

The substantially reflective inorganic particles preferably have an average diameter approximately equal to or greater than the average thickness of the pressure sensitive adhesive layer. The use of relatively large diameter particles has the advantage of preventing blocking, where the surface of the membrane comprising the inorganic particles will adhere to the carrier surface 17 when the membrane is rolled up. By eliminating blocking, this eliminates the need for a release liner, the removal of which creates waste as well as an extra step during installation. A particle size analyzer that measures the volume percentage of particles as a function of particle diameter can be used to determine average particle size diameter.

Hydrated white Portland cement particles are preferably produced by mixing white Portland cement with water at a water to cement ratio of 0.22 to 0.50 with a dispersant, allowing the cement to cure, preferably, for seven days or more, milling, and sieving to achieve the appropriate range of particle sizes. Polycarboxylate dispersants are preferred. Most preferred are ethylene oxide-based polycarboxylates like ADVA 120 produced by W.R. Grace. The level of dispersant is 0.1% to 1% active surfactant based on dry cement. Hydrated aluminate cement particles may be produced in a similar manner.

Hydrated white cement particles may also include one or more additives such as admixtures, antioxidants, UV stabilizers, and white pigments blended therewith. Various admixtures may be added to the hydrated cement particles for one or more of the following purposes: (1) to enhance the bond of the particles to concrete; (2) accelerate the time of initial setting of concrete at the membrane interface; (3) to accelerate the rate of strength development of concrete at the membrane interface; (3) to increase the strength of the particles and the concrete at the membrane interface; (4) to decrease the capillary flow of water within the particles and concrete at the membrane interface; (5) to decrease permeability of the particles and concrete at the membrane interface to liquids; and (7) to inhibit the corrosion of embedded metal, such as to protect steel reinforcement in a concrete matrix.

Bonding admixtures are usually added to cement mixtures to increase the bond strength between old and new concrete. These include aqueous emulsions including polyvinyl acetate, acrylics, and styrene butadiene copolymers. Spray dried versions of these polymers may be used as well. Set accelerators include triethanolamine, sodium thiocyanate, calcium formate, calcium nitrite, calcium nitrate, calcium chloride, nitrite, chloride, formate, nitrate or mixture thereof. Antioxidants and UV absorbers are operative to protect the pressure sensitive adhesive against degradation. UV absorbers are selected from a list including benzotriazoles, hydroxyphenyl-triazines, and benzophenones. Antioxidants are selected from a list including hindered amines and hindered phenols. Pigments are operative to increase the reflectivity of the white hydrated cement particles and may be selected from a list including titanium dioxide, zinc oxide, white silica sand, calcium carbonate, and alumina trihydrate.

The membrane can be manufactured as follows. Pressure sensitive adhesive is hot melt coated onto the carrier sheet by any one of a number of coaters including knife over roll coater, slot die coater, roll coater, or curtain coater. The particles are applied to the adhesive while it is still warm and soft. To enhance adhesion of the particles to the pressure sensitive adhesive, the particle-coated membrane may be passed through a nip. Excess particles are removed by gravity, vacuum, brushing, or a combination of these methods. The membrane is then wound into a roll.

EXAMPLE 1

The effect of particle size of the particulate layer to prevent blocking was tested with a membrane comprising a particulate inorganic layer, a pressure sensitive adhesive and a 400 μm HDPE carrier. Four different particle sizes were evaluated, namely particles with an average particle size of 10 μm, 80 μm, 250 μm and 343 μm, on three different thicknesses of pressure sensitive adhesive, namely 125 μm, 250 μm and 375 μm. The pressure sensitive adhesive was hot melt coated onto the carrier, then the particles were coated onto the adhesive by applying an excessive amount by hand. The particles were embedded into the adhesive by applying pressure of 30 lbs/ft² (0.0014 megapascal) at a temperature of 65° C. (The membrane, covered with a plastic film, was placed between two sheets of glass, a weight was placed on the upper sheet of glass, and the assembly was placed in an oven.) Excess particles were removed with a vacuum. A layer of untreated 400 μm HDPE carrier sheet was placed on top of the particle coated face of 5 cm×15 cm samples of the various particle coated membranes described above. A pressure of 2 psi (0.014 megapascal) at 65° C. was applied for 24 hrs. The samples were cooled and 180 degree peel adhesion was measured at 5 cm/min with an Instron mechanical tester. The results are reported in pounds per lineal inch (pli or lb/in) (also converted to kg/cm) and shown in Table 1 below. As will be evident, blocking resistance is excellent (i.e., the HDPE carrier sheet releases easily from the particle coated membrane surface) for those samples where the average particle size is larger than the thickness of the pressure sensitive adhesive.

TABLE 1

| | Peel Adhesion pli (kg/cm) Particle size | | | |
| --- | --- | --- | --- | --- |
| Adhesive thickness | 10 μm | 80 μm | 250 μm | 343 μm |
| 125 μm | 9.5 (1.7) | 8 (1.4) | 0.2 (0.04)* | 0* |
| 250 μm | | | | 0* |
| 375 μm | | | 13.3 (2.4) | 0.5 (0.09)* |

*acceptable blocking resistance

EXAMPLE 2

The effect of particle reflectivity on bond to concrete after UV exposure was evaluated. All specimens comprise a 400 μm high-density polyethylene carrier sheet coated with 125 μm of pressure sensitive adhesive B or pressure sensitive adhesive C. The surface of each pressure sensitive adhesive was coated with particles of ground hydrated white cement or ground hydrated gray cement using the technique described in Example 1. The particles were prepared by blending cement with water at a water cement ratio of 0.25 along with 0.25% (wt. % solids on dry cement) of dispersant ADVA 120 (W.R. Grace). The cement pastes were cured for seven days and milled. The milled particles were sieved and the fraction falling through a 600 μm sieve onto a 300 μm sieve were used. The whiteness of the particles as measured with a NOVO-SHADE 45/0 Reflectometer was 70 for the white particles and 25 for the gray particles. Four sets of membrane specimens were prepared, each cut into four 2.5 cm×15 cm samples. The samples were sent to Atlas Material Testing Technology for EMMAQUA (accelerated outdoor UV) exposure. Each of the four sets were exposed for 0 mj, 28, mj, 56 mj, and 84 mj of solar radiation. Concrete was cast against the exposed particle surface and allowed to cure for seven days. Peel adhesion was evaluated with an Instron mechanical tester at a peel angle of 90° and a peel rate of 5 cm/min. Results are shown in pounds per lineal inch (pli or lb/in) (also converted to kg/cm) in Table 2.

TABLE 2

| | Peel Adhesion (pli) UV exposure | | | |
| --- | --- | --- | --- | --- |
| Sample | 0 mj | 28 mj | 56 mj | 84 mj |
| Gray part on psa B | 8.6 (1.6) | 12.0 (2.2) | 11.1 (2.0) | 5.2 (0.9) |
| Gray part on psa C | 11.4 (2.1) | 10.3 (1.9) | 10.1 (1.8) | 8.5 (1.5) |
| White part on psa B | 9.7 (1.7) | 17.0 (3.1) | 13.6 (2.4) | 11.6 (2.1) |
| White part on psa C | 11.6 (2.1) | 15.9 (2.9) | 13.6 (2.4) | 8.2 (1.5) |

Note that bond to concrete after UV exposure is better for samples comprising the highly reflective white particles versus corresponding samples made with the gray particles. Also, note that bond to concrete improves after early exposure (particularly after 28 mj) versus that for the unexposed samples. Without being bound by any theory, it appears that there are likely two processes occurring simultaneously. First the particles become better attached to the pressure sensitive adhesive after UV and heat exposure versus the level of attachment for the unexposed samples. This process causes the bond level to concrete to increase. Second, the pressure sensitive adhesive undergoes degradation with UV and heat exposure. This process causes the bond level to concrete to decrease.

EXAMPLE 3

The procedure of Example 2 was repeated during a warmer time of year using a membrane coated with pressure sensitive adhesive C. Results are shown in pounds per lineal inch (pli) (also converted to kg/cm) in Table 3.

TABLE 3

| Sample | Peel Adhesion pli (kg/cm) UV exposure | | | |
|---|---|---|---|---|
| | 0 mj | 28 mj | 56 mj | 84 mj |
| Gray part on psa C | 9.7 (1.7) | 2.8 (0.5) | 1.3 (0.2) | 0.9 (0.2) |
| White part on psa C | 14.9 (2.7) | 17.5 (3.2) | 16.5 (3.0) | 17.0 (3.1) |

Note that bond to concrete after UV exposure is better for samples comprising the highly reflective white particles versus corresponding samples made with the gray particles. In comparison to the results for Example 2, there is no dramatic increase in bond to concrete after short-term UV exposure. Bond values for the highly reflective samples comprising white particles change little with UV exposure. In contrast, bond values for samples comprising the gray particles decrease significantly even after short-term UV exposure. Without being bound by any theory, it appears that, although the exposure levels (solar radiation as measured in mj) were the same in both Examples 2 and 3, the samples in Example 3 were likely exposed to higher temperatures that resulted in more rapid degradation of the pressure sensitive adhesive coated with the gray particles.

The invention claimed is:

1. A waterproofing membrane consisting of a flexible carrier sheet with two opposed surfaces, an approximately uniform layer of a waterproofing pressure sensitive adhesive on one surface of the carrier sheet such that the pressure sensitive adhesive has an average thickness in the range of 75 μm to 500 μm and has an outer exposed surface, and substantially reflective inorganic particles adhered directly to the outer exposed surface of the pressure sensitive adhesive, wherein the substantially reflective inorganic particles have an average diameter of about 100 μm to about 600 μm that is approximately equal to or greater than the average thickness of the pressure sensitive adhesive layer, wherein the substantially reflective particles cover approximately 80% to 100% of the outer exposed surface of the pressure sensitive adhesive so as to provide the membrane with a substantially reflective surface that exhibits a whiteness value greater than 65%, and wherein the waterproofing membrane does not include a removable release sheet.

2. The waterproofing membrane of claim 1 wherein the substantially reflective inorganic particles comprise ground white cement, ground hydrated white cement, ground partially-hydrated white cement or a mixture of two or more of these.

3. The waterproofing membrane of claim 2 wherein the pressure sensitive adhesive has an average thickness in the range of 125 μm to 375 μm.

4. The waterproofing membrane of claim 3 wherein the substantially reflective particles cover approximately 90% to 100% of the outer exposed surface of the pressure sensitive adhesive.

5. The waterproofing membrane of claim 4 wherein the reflective surface of the membrane exhibits a whiteness value of at least about 70%.

6. The waterproofing membrane of claim 1 wherein the carrier sheet has a thickness of about 0.05 to 2.0 mm.

7. The waterproofing membrane of claim 6 wherein the carrier sheet comprises a polymer film or a polymer coated fabric.

8. The waterproofing membrane of claim 6 wherein the carrier sheet comprises polyethylene, polypropylene, ethylene-propylene copolymers, ethylene-olefin copolymers, ethylene-vinyl acetate copolymers, polyvinyl acetate, polyethyl acrylate, polytetrafluoroethylene, polyvinylidene fluoride, polyethylene terephthalate, polyvinyl chloride, polyamides or a combination of two or more of these materials.

9. The waterproofing membrane of claim 1 wherein the pressure sensitive adhesive comprises a butyl rubber based adhesive, a polyisobutylene based adhesive, an acrylic based adhesive, a styrene-isoprene-styrene (SIS) based adhesive, a styrene-ethylene-butylene-styrene (SEBS) based adhesive, a styrene-butadiene-styrene (SBS) based adhesive, a styrene-butadiene rubber (SBR) based adhesive, or a combination of two or more of these materials.

10. A method of waterproofing a concrete structure comprising applying a waterproofing membrane according to claim 1 to a substrate with the substantially reflective inorganic particles of the membrane facing the area into which the concrete will be cast, and casting concrete such that it contacts the substantially reflective particles of the membrane.

11. The method of claim 10 wherein the substantially reflective inorganic particles of the waterproofing membrane comprise ground white cement, ground hydrated white cement, ground partially-hydrated white cement or a mixture of two or more of these.

12. The method of claim 11 wherein the substantially reflective particles cover approximately 90% to 100% of the outer exposed surface of the pressure sensitive adhesive so as to provide a reflective surface that exhibits a whiteness value of at least 70%.

13. A waterproofing membrane consisting essentially of a flexible carrier sheet with two opposed surfaces, an approximately uniform layer of a waterproofing pressure sensitive adhesive on one surface of the carrier sheet such that the pressure sensitive adhesive has an average thickness in the range of 75 μm to 500 μm and has an outer exposed surface, and substantially reflective inorganic particles adhered directly to the outer exposed surface of the pressure sensitive adhesive, wherein the substantially reflective inorganic particles comprise ground white cement, ground hydrated white cement, ground partially-hydrated white cement or a mixture of two or more of these, wherein the substantially reflective inorganic particles have an average diameter of about 100 μm to about 600 μm that is approximately equal to or greater than the average thickness of the pressure sensitive adhesive layer, wherein the substantially reflective particles cover approximately 80% to 100% of the outer exposed surface of the pressure sensitive adhesive so as to provide the membrane with a substantially reflective surface that exhibits a whiteness value greater than 65%, and wherein the waterproofing membrane does not include a removable release sheet.

14. The waterproofing membrane of claim 13 wherein the substantially reflective inorganic particles additionally comprise one or more additives blended therewith.

15. The waterproofing membrane of claim 13 wherein the substantially reflective inorganic particles cover approximately 90% to 100% of the outer exposed surface of the pressure sensitive adhesive, and provide a reflective surface that exhibits a whiteness value of at least 70%.

\* \* \* \* \*